US007577640B1

(12) United States Patent
Bland et al.

(10) Patent No.: US 7,577,640 B1
(45) Date of Patent: Aug. 18, 2009

(54) HIGHLY AVAILABLE, HIGHLY SCALABLE MULTI-SOURCE LOGICAL DATABASE WITH LOW LATENCY

(75) Inventors: M. Alan Bland, Boulder, CO (US); John F. Henry, Lakewood, CO (US); Danny Lee Prentice, Broomfield, CO (US); Richard Shaffer Youngkin, Littleton, CO (US)

(73) Assignee: Avaya Inc., Basking Ridge, NJ (US)

( * ) Notice: Subject to any disclaimer, the term of this patent is extended or adjusted under 35 U.S.C. 154(b) by 554 days.

(21) Appl. No.: 10/830,288

(22) Filed: Apr. 21, 2004

Related U.S. Application Data (60) Provisional application No. 60/558,615, filed on Mar. 31, 2004.

(51) Int. Cl.
*G06F 7/00* (2006.01)
*G06F 17/30* (2006.01)

(52) U.S. Cl. ............................ 707/3; 707/200; 711/114; 711/165; 711/154

(58) Field of Classification Search ......... 707/200–205, 707/10, 8, 100, 3, 101, 5, 1; 711/161–162; 714/118; 709/225, 216, 226
See application file for complete search history.

(56) References Cited

U.S. PATENT DOCUMENTS

| 5,136,707 | A | * | 8/1992 | Block et al. .................. 707/201 |
| 5,206,942 | A | * | 4/1993 | Ibi ................................. 711/5 |
| 5,418,945 | A | * | 5/1995 | Carter et al. .................... 707/8 |
| 5,701,473 | A | * | 12/1997 | Braseth et al. ............... 707/205 |
| 6,275,912 | B1 | * | 8/2001 | Haba .......................... 711/154 |
| 6,662,268 | B1 | * | 12/2003 | McBrearty et al. .......... 711/114 |
| 7,065,527 | B2 | * | 6/2006 | McCartney et al. ........... 707/10 |
| 7,287,043 | B2 | * | 10/2007 | Lindsay et al. ............... 707/200 |
| 2002/0161748 | A1 | * | 10/2002 | Hamel et al. .................... 707/3 |
| 2002/0174225 | A1 | * | 11/2002 | Smith et al. .................. 709/226 |
| 2003/0028590 | A1 | * | 2/2003 | Gonzalez et al. ............ 709/203 |
| 2003/0149709 | A1 | * | 8/2003 | Banks ........................ 707/200 |
| 2004/0054777 | A1 | * | 3/2004 | Ackaouy et al. ............. 709/225 |
| 2004/0148481 | A1 | * | 7/2004 | Gupta ......................... 711/165 |
| 2004/0243646 | A1 | * | 12/2004 | Teodosiu et al. ............ 707/200 |
| 2006/0173875 | A1 | * | 8/2006 | Stefaniak .................... 707/101 |

OTHER PUBLICATIONS

"An overview of data warehousing and OLAP technology"; Surajit Chaudhuri, Umeshwar Dayal; Mar. 1997; ACM.*

* cited by examiner

*Primary Examiner*—Jean M Corrielus
*Assistant Examiner*—Giovanna Colan
(74) *Attorney, Agent, or Firm*—Sheridan Ross P.C.

(57) ABSTRACT

A database architecture providing high availability and scalability is provided. According to embodiments of the present invention, multiple data sources are supported by multiple source databases. Partial copies of data stored in one or more of the source databases are provided to a consolidated database in response to requests for data received by the consolidated database from a data client. Multiple consolidated databases may support multiple data clients and data clients that are geographically dispersed. A sparse replication component operates to retrieve data from the source databases for storage in consolidated databases. The sparse data replication component can also monitor source databases for updates to requested data, and retrieve such data for storage in a consolidated database. In addition, each consolidated database may be associated with a data rationalization component to ensure that the data stored in the associated consolidated database does not include pathological data redundancies.

37 Claims, 4 Drawing Sheets

HIGHLY AVAILABLE, HIGHLY SCALABLE MULTI-SOURCE LOGICAL DATABASE WITH LOW LATENCY

CROSS REFERENCE TO RELATED APPLICATION

This application claims the benefit of U.S. Provisional Application No. 60/558,615, filed Mar. 31, 2004, entitled "Highly Available, Highly Scalable Multi-Source Logical Database with Low Latency", the inventors being M. Alan Bland, John F. Henry, Danny L. Prentice, and Richard S. Youngkin, the entire disclosure of which is hereby incorporated herein by reference.

FIELD OF THE INVENTION

The present invention is related to databases. In particular, the present invention provides a database architecture suitable for use with multiple data sources and multiple data clients that is highly available and highly scalable.

BACKGROUND OF THE INVENTION

Databases are used to store large quantities of computer data. In order to increase the usefulness of a database, it is desirable to enable the storage of data such that it can be easily and quickly stored, can be easily and quickly retrieved, is secure, and addresses ambiguities regarding current data where multiple copies or versions of data are stored. It also is desirable to limit the amount of time required to perform updates of stored data. In addition, it is desirable to limit the amount of data that must be transferred across communications networks to data sources and/or database clients that are distributed across multiple geographic sites to reduce latency for near real time applications.

Figure 1A:
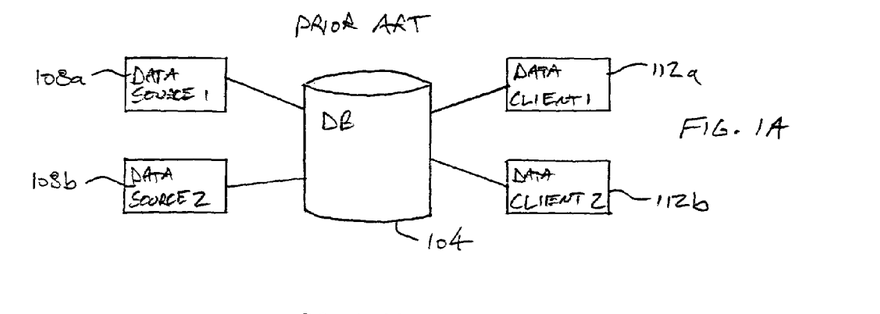
FIGS. 1A-C are block diagrams depicting prior art database architectures.

One approach to providing a database architecture, illustrated in FIG. 1A is to provide a single centralized database 104 that serves multiple data sources 108a-b and multiple data clients 112a-b. Although a centralized architecture avoids issues regarding identifying current versions of data, the scalability and availability of such an arrangement is poor. In particular, such arrangements are slow and cumbersome when used with large volumes of data, and/or in real-time or other high availability applications, especially when the data sources and data clients are geographically dispersed.

Figure 1B:
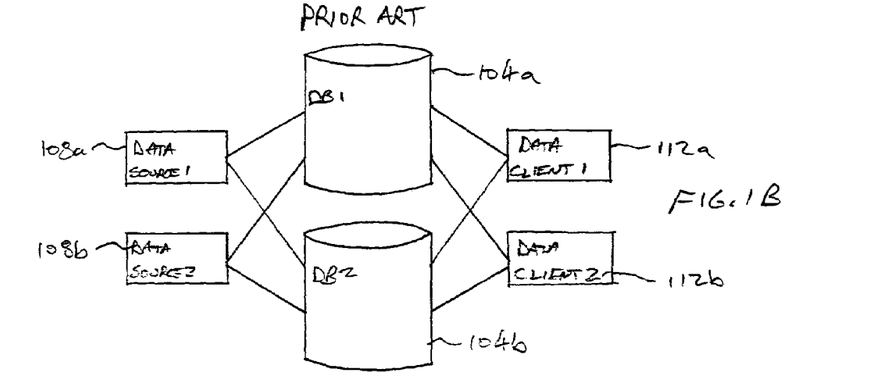

Another approach is to provide multiple databases, for example as illustrated in FIG. 1B. According to such an approach, multiple databases 104a-b each receive data from multiple data sources 108a-b and provide requested data to multiple data clients 112a-b. By using multiple databases 104a-b that each receive identical sets of data from the multiple databases 104a-b, redundancy is provided. In addition, availability with respect to serving requests for data from data clients 112a-b is improved as compared to single database solutions. However, the use of multiple databases 104a-b requires complex application logic in order to resolve data redundancy issues. In addition, scalability is poor, particularly where there are large numbers of users.

Figure 1C:
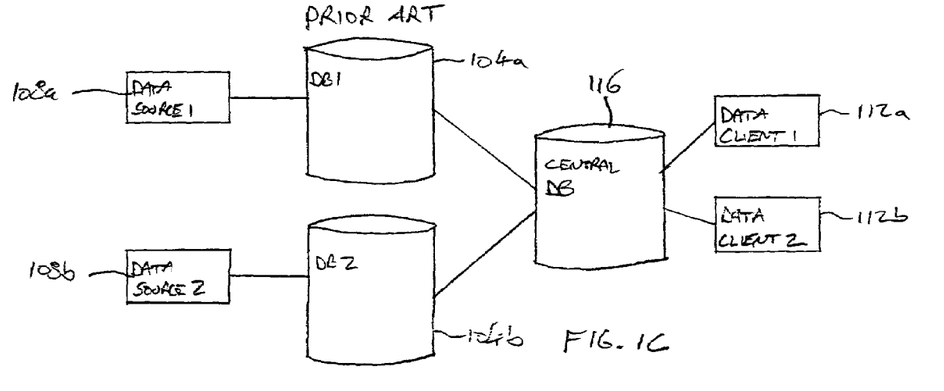

Yet another approach, illustrated in FIG. 1C, is to provide multiple databases 104 for multiple data sources 108a-b, and to copy data from each of the databases 104a-b to a single, central database 116 that serves multiple data clients 112. This approach provides a centralized location from which a complete set of data may be accessed by data clients 112. In addition, this approach provides redundancy. To further increase availability, multiple central databases 116 can be used. However, such arrangements have poor scalability. For example, in order to ensure that each central database 116 has a complete and up to date set of data, large amounts of data must be transferred from each database 104 to each central database 116. Large data transfers increase latency between the data sources and the data clients, limiting the suitability of this arrangement for real time applications.

Conventional database structures have been incapable of providing both high availability and high scalability with low latency. Accordingly, a need remains for a database architecture that can be scaled to support many data sources and many data users, while at the same time providing good availability and allowing updates involving large volumes of data to be performed with low latency.

SUMMARY OF THE INVENTION

The present invention is directed to solving these and other problems and disadvantages of the prior art. According to embodiments of the present invention, a database architecture using multiple consolidated databases featuring sparse replication among multiple database views that are created on demand in response to requests from data clients is provided. The multiple consolidated databases may receive information from multiple source databases.

In accordance with embodiments of the present invention, the multiple consolidated databases may each serve one or more data clients. Furthermore, the data contained in the consolidated databases may be defined, at least in part, by requests for data received from data clients. In accordance with additional embodiments of the present invention, the multiple source databases may each receive data from one or more data sources.

A sparse replication component is provided to support the run-time execution of on-demand data replication definitions. In particular, the sparse replication component obtains requested data from source databases, and forwards that data to a consolidated database servicing the requesting data client. In addition, the sparse replication component provides updated or modified data to the consolidated database.

A data rationalization component may be associated with each consolidated database. In accordance with embodiments of the present invention, the data rationalization component is a rules-based extension of the physical data model that is evaluated as updated data is received from the sparse replication component. In particular, the execution of the rules associated with the data rationalization component ensures that the data stored in an associated consolidated database does not contain any pathological data redundancies.

According to embodiments of the present invention, a method is provided in which data from a first data source is stored in a first source database, while data from a second data source is stored in a second source database. In accordance with additional embodiments of the present invention, data from multiple data sources may be stored in multiple source databases. In response to a request for data received at a consolidated database from a data client, requested data is retrieved from those source databases containing the requested data and is stored in the consolidated database. Subsequent requests for that data from data clients interconnected to the consolidated database can then be serviced by the consolidated database.

New or modified data continues to be stored in the source databases. When new or modified data that is within the scope of data that has been requested by a data client becomes available, that new or modified data is stored in the consolidated database. At the same time, data stored in the consolidated database that has become obsolete can be deleted.

The data stored in a consolidated database is generally only a partial copy of all of the data stored in the source databases. When requests for data that is not stored in a consolidated database are received, such data is retrieved from the appropriate source databases. Accordingly, the data stored in a consolidated database may be determined by the requests for data made by data clients.

DETAILED DESCRIPTION

Figure 2:
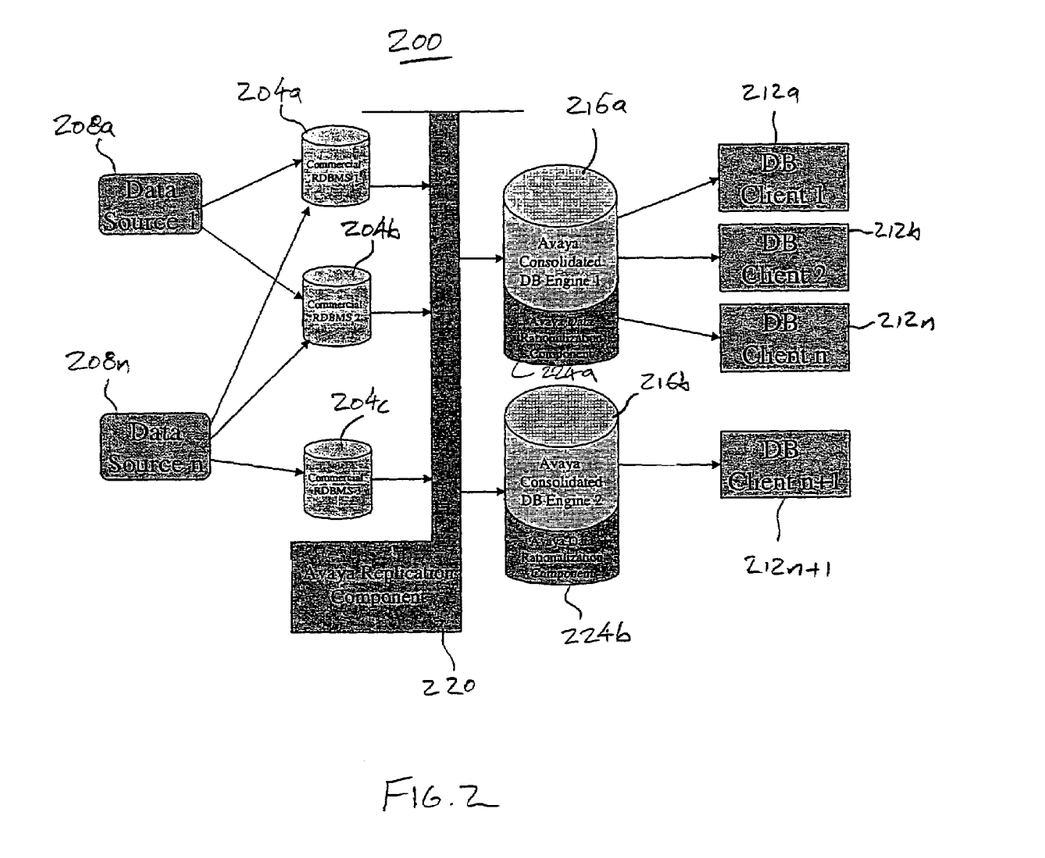
FIG. 2 is a block diagram depicting a database architecture in accordance with embodiments of the present invention.

With reference now to FIG. 2, a database system 200 in accordance with embodiments of the present invention is depicted in block diagram form. As shown, the system 200 is generally used in connection with multiple source databases 204a-c, receiving data from multiple data sources 208a-n. In addition, multiple data clients 212a-n+1 may receive data from one or more consolidated databases 216a-b. The source databases 204 are generally interconnected to the consolidated databases 216 through a sparse data replication component 220.

A source database 204 may comprise a database instance. In accordance with embodiments of the present invention, a source database 204 may comprise a physical database having physical data storage operated in connection with database software that is local to an interconnected data source 208. A source database 204 may also comprise a logical database that is implemented as part of a physical database that includes a number of logical databases. In accordance with embodiments of the present invention, a source database 204 may comprise a commercially available relational database. In a typical implementation, each source database 204 includes only a partial view of the data stored within the system 200.

A data source 208 may include any process that writes or otherwise provides data to a source database 204. Furthermore, a data source 208 may comprise a source of original data, and/or a process that operates to collect and compile existing data. As an example, a data source 208 may comprise a process running on an automatic call distribution center.

A data client 212 may be any consumer or user of data. The requests for data made by data clients 212 interconnected to a consolidated database 216 generally determine the data contained in the consolidated database 216. As an example, a data client 212 may comprise an administrator entering queries using standard sequential query language (SQL).

A consolidated database 216 is a database that generally contains no more than a partial view of the data stored in the source databases 204. In general, a consolidated database comprises physical data storage operated in connection with instructions that allow requests for data received from data clients 212 to specify on-demand data replication definitions. Such replication definitions may be formulated using standard sequential query language. As will be described in greater detail elsewhere herein, the data stored in a consolidated database 216 is determined, at least in part, by the requests for data received from data clients 212.

In addition, each consolidated database 216 includes or is associated with a data rationalization component 224. For instance, a first consolidated database 216a includes a first data rationalization component 224a and a second consolidated database 216b includes a second data rationalization component 224b. The data rationalization component generally operates as a rules based extension of the physical data model of an associated consolidated database 216 that evaluates the data model as updates are received. In particular, the data rationalization component operates to ensure that data provided to data clients 212 does not contain any pathological redundancies. In accordance with embodiments of the present invention, the data rationalization rules of a data rationalization component 224 are specified in a plain text file and can be easily modified if desired.

A single data source 208 may supply data to a single source database 204. For instance, as illustrated in FIG. 2, a first data source 208a may supply data to a first source database 204a. The first data source 208a may also supply data to a second source database 204b, for example if it is unable to access the first source database 204a. A data source may also write to multiple source databases 204 simultaneously. For instance, as illustrated in FIG. 2, a second data source 208b may write to a number of source databases 204a-c in order to provide redundant copies of the complete source data. As can be appreciated from one of skill in the art, a data source 208 may also distribute data among a number of source databases 204 according to various storage schemes, to allow a complete copy of the data provided by the source to be retrieved, even if only a subset of the source databases 204 are available at any given time. According to embodiments of the present invention, a source database 204 receives data exclusively or primarily from a data source or sources 208 that are local to the source database 208. As can be appreciated by one of skill in the art, various communication link technologies may be used to interconnect a data source 208 to a source database 204. For example, a data source 208 and a source database 204 may be interconnected to one another by an Ethernet network or other communication network.

One or more data clients 212 may be interconnected to each consolidated database 216. In general, a consolidated database 216 is interconnected to local data clients 212. As will be described in greater detail elsewhere herein, each a consolidated database 216 generally contains a view that is only a sparse representation of the data stored in the source databases. Accordingly, a consolidated database 216 functions as or like a virtual database, because the data it contains is obtained by querying the source databases 204, and from updates received from the source databases 204.

The sparse replication component or replication component 220 is a process that supports the run-time execution of on-demand data replication definitions. As such, the sparse replication component 220 monitors the source databases 204, and gets requested data and changes to such data from the source databases 204 in accordance with data request and replication definitions received from one or more consolidated databases 216.

Figure 3:
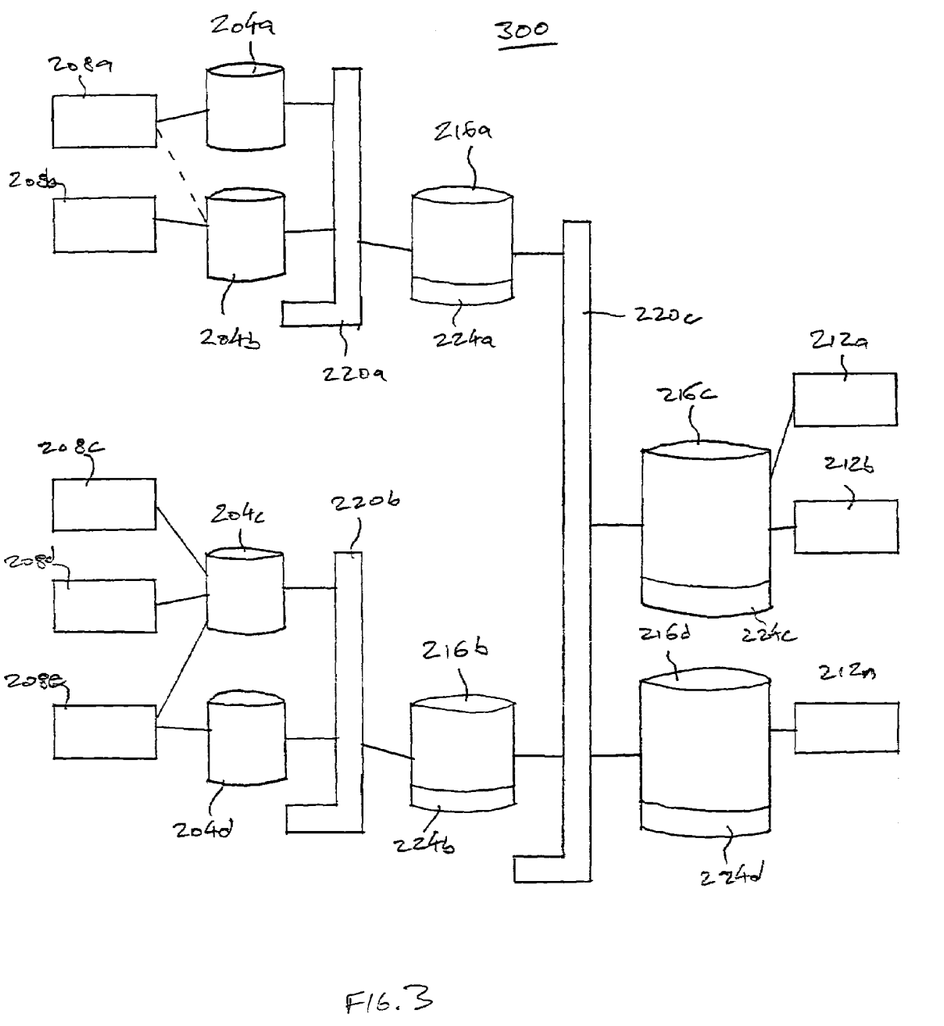
FIG. 3 is a block diagram depicting a database architecture in accordance with other embodiments of the present invention.

With reference now to FIG. 3, a system 300 in accordance with other embodiments of the present invention is illustrated. In particular, the system 300 includes a hierarchical organization of consolidated database engines to provide additional scaling. The top level, which includes top level consolidated databases 216c and 216d, and sparse replication component 220c, provides a complete centralized view of requested data to data clients 212a-n. The top layer consolidated databases 216c-d receive data and updates to requested data from the middle layer consolidated databases 216a-b through the top layer replication component 220c.

The middle layer consolidated databases 216a and 216b each typically -contain a portion of the data maintained in the top layer consolidated databases 216c and 216d. The first middle layer consolidated database 216a receives requested data and updates to requested data from a first set of source databases 204a-b through a sparse replication component 220a. The first set of source databases 204a-b are generally interconnected to data sources 208a-b. Similarly, the second middle layer consolidated database 216b receives requested data and updates to requested data from a second set of source databases 204c-d through a separate sparse replication component 220b. The second set of source databases 204c-d are generally interconnected to a second set of sources 208c-e. Each consolidated database 216a-d includes a rationalization component 224. Although only two tiers or layers of consolidated databases 216 and sparse replication components 220 are shown, any number of layers may be provided, for example if further scaling is desired.

Figure 4:
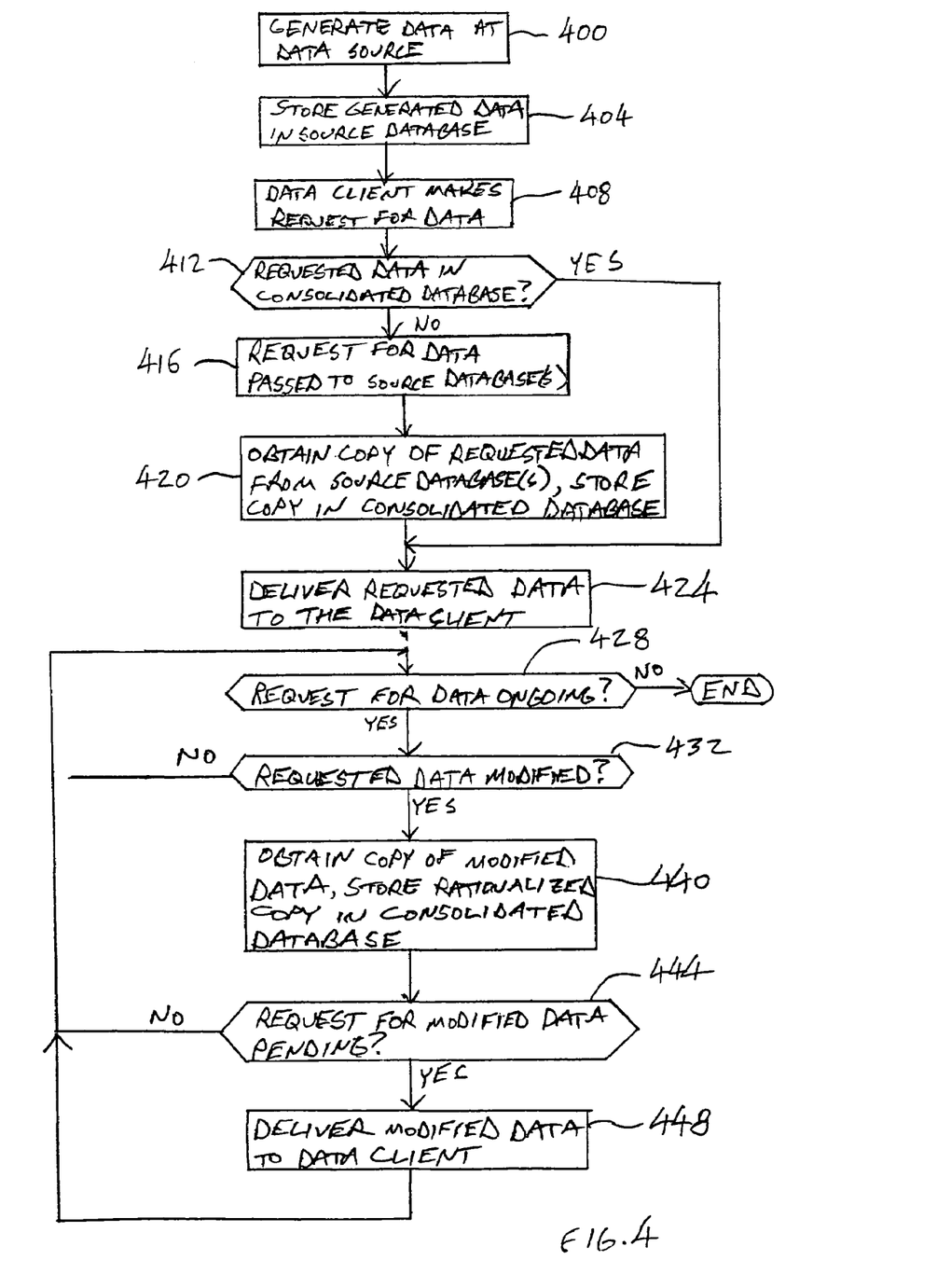
FIG. 4 is a flowchart depicting the operation of a database system in accordance with embodiments of the present invention.

With reference now to FIG. 4, the operation of embodiments of the present invention is depicted. With respect to the creation and storage of data, data is initially generated at a data source 208 (step 400). As the data is generated, it is stored in one or more of the source databases 204 (step 404). The identity or number of source databases 204 that a data source 208 stores data in may be selected according to the availability of individual databases 208, and/or in accordance with any redundancy schemes implemented for the source data.

With respect to requests for data, a data client 212 issues a request for data that is passed to a consolidated database 216 serving the requesting data client (step 412). A determination is then made as to whether the requested data is available from the consolidated database 216 (step 416). If the requested data is available, it is delivered to the data client by the consolidated database 216 (step 424). If the requested data is not available from the consolidated database 216, the request is passed through the sparse replication component 220 to the source database or databases 216 that contain or that should contain the requested data (step 416). Accordingly, the sparse data replication component 220 maintains or has access to information that allows it to query those source databases 204 from which the requested data can be obtained. The requested data is then copied from the relevant source database or databases 204 to the consolidated database 216 through which the request has been made (step 420), and is delivered to the requesting data client 212 (step 424).

As can be appreciated by one of skill in the art and from the description provided herein, steps related to the storage of data generated by data sources 208 may be ongoing, and may occur while other of the described steps are being performed. Furthermore, while at least some data will need to be stored in a source database 204 before a request for data from a data client can be acted on, steps related to requests for data may be interspersed with steps related to the storage of data. As can also be appreciated by one of skill in the art and from the description provided herein, the process depicted in FIG. 4 discusses a single request for data by a data client 212 for purposes of clarity. However, the present invention is not so limited. For example, where multiple requests for data are received at or about the same time, multiple versions of processes such as depicted in FIG. 4 can be ongoing simultaneously.

At step 428, a determination is made as to whether the request for data made by the data client 212 is ongoing (i.e. whether further requests for the requested data or for modifications to that data are anticipated or required). If the request is not ongoing, the process may end.

If the request is ongoing, the sparse data replication component 220 determines whether requested data has been updated or otherwise modified since a copy or partial copy of that data was last stored in the consolidated database 212 (step 432). If a modification to the requested data is not detected, the process may return to step 428.

If an update or other modification to requested data is detected at step 432, the modified data is obtained from the source database or databases 204, and is copied to the consolidated database 216 (step 440). A determination is then made as to whether a request for modified data is pending (step 444). For example, where a data client 212 has made a request for ongoing updates to be delivered, a request for modified data will be pending. If it is determined that the request for modified data is pending, a copy of the modified data is delivered to the requesting data client 212 (step 448). The process may then return to step 428 to determine whether the request remains ongoing. As part of copying modified data to a consolidated database 216, the data rationalization component 224 associated with the consolidated database 216 ensures that only a rationalized copy of the data is maintained by the consolidated database 216. For example, old data that is now obsolete or that is in conflict with the modified data is removed from the consolidated database 216 by the data rationalization component 224.

As an example of the operation of a rationalization component 224, where portions of requested data are originally stored in multiple source databases 204, the rationalization component 224 of a consolidated database applies rules to provide a single view of the requested data to a data client 212. Accordingly, a rationalization component may add instances of an event or occurrence that is the subject of a query initiated by a data client 212 using data from a number of source databases 204. For instance, in the context of a call center where a data client 212 queries the system 200 for information regarding how many calls a particular agent has handled, a first source database 204 may contain records relating to five calls handled by the subject agent, while a second source database 204 may contain records concerning two calls handled by that agent. The data rationalization component 224 then combines the information and provides the resulting value of seven for storage in the associated consolidated database 216 for presentation to the data client 212. As can be appreciated by one of skill in the art, information regarding a single agent may be maintained in more than one source database 204 as a result of data redundancy procedures or the operation of a failover mechanism.

A data rationalization component 220 in accordance with embodiments of the present invention may also operate to resolve inconsistencies between data stored in different source databases 204. For example, the latest information regarding the status of an agent held by a first source database 204a may indicate that the agent is on break. If a connection between the call center with which the agent is associated and the first source database 204a is lost, a failover mechanism may operate to cause data from the call center to be stored in a second source database 204b. The second source database 204b may therefore contain more recent information, for example indicating that the agent is now actively handling calls. In response to a query from a data client 212 regarding the status of the agent, the data rationalization component may operate to present the data contained in the second source database 204b by applying a rule that data contained in the most recently updated record is to be stored in the consolidated database 216 and presented to the requesting data client 212. The data rationalization component 220 may also use information contained in fields other than date fields to resolve inconsistencies in data. For example, a record may contain a value in a designated field indicating that the data contained in one or more other fields of that record is not reliable, and should not be stored or maintained in a consolidated database 216 or used as a source of data reported to a data client 212. Accordingly, the data rationalization component 220 may operate to obtain the requested data from a different record, which may be a record maintained by a different source database.

Embodiments of the present invention provide a sparse representation of system data stored in consolidated databases 216. In particular, data that is relevant to requests made by data clients 212 is stored in consolidated databases 216. As a result, the amount of data that must be searched in connection with queries related to requested data is reduced, as compared to systems in which a complete set of source data must be searched to satisfy requests for data. In addition, by providing a consolidated database to each data client, requests for data can be satisfied without requiring real-time access across a number of source databases. Accordingly, embodiments of the present invention provide enhanced scalability as compared to certain conventional database arrangements.

In addition, because the sparse replication component 220 operates to obtain modified data associated with ongoing requests for data made by data clients 212, such data is more immediately available to data clients 212. In particular, embodiments of the present invention automatically provide a copy of relevant modified data to a consolidated database 216. Therefore, embodiments of the present invention provide improved data latency as compared to certain conventional database arrangements.

Embodiments of the present invention also provide enhanced data availability as compared to conventional database arrangements, while maintaining improved scalability and data latency characteristics. In particular, measures to provide data redundancy can be provided, without adversely impacting performance.

Applications for embodiments of the present invention include call distribution center administration and control, even where individual call centers that generate large volumes of data, and even where such call centers are geographically dispersed. However, embodiments of the present invention are not so limited. In particular, embodiments of the present invention can be applied to any application that requires near real-time reporting of activities from multiple sources. Furthermore, embodiments of the present invention have application to systems in which high availability, the ability to be scaled to handle many data sources and many users, and the ability to provide high volume data updates of very large databases with low latency is desired.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A computational component for performing a method, the method comprising:
   storing first data in a first source database on at least a first device;
   storing second data in a second source database on at least one of the first device and a second device;
   receiving at a first consolidated database established on at least a third device a first request for selected data from a fourth device comprising a first data client, wherein said selected data identified by said first request for selected data includes a portion of said first data, wherein said portion of said first data is less than all of said first data, and wherein said selected data identified by said first request for selected data includes a portion of said second data;
   in response to said first request for selected data and after determining by said first consolidated database that said selected data is not entirely stored on said first consolidated database:
      retrieving by a sparse replication component said portion of said first data from said first source database, wherein said sparse replication component queries said first source database for said portion of said first data, wherein said sparse replication component is interposed between said first and second source databases and said first consolidated database, and wherein said sparse replication component is interposed between said first and second source databases and a second consolidated database;
      storing said portion of said first data in said first consolidated database;
      retrieving by said sparse replication component said portion of said second data from said second source database, wherein said sparse replication component queries said second source database for said portion of said second data;
      storing said portion of said second data in said first consolidated database;
   detecting by said sparse replication component a modification to said selected data in at least one of said first source database and said second source database;
   in response to said detecting, determining by said sparse replication component a need to update said selected data stored in said first consolidated database;
   in response to said determining a need to update said selected data stored in said first consolidated database, retrieving updated selected data from at least one of said first source database and said second source database; and
   storing said updated selected data in said first consolidated database, wherein said first consolidated database contains only a partial copy of said first data and only a partial copy of said second data.

2. The method of claim 1, further comprising:
   removing old data modified by said detected modification to said selected data from said first consolidated database.

3. The method of claim 1, wherein said determining a need to update said selected data stored in said first consolidated database comprises determining that a predetermined period of time has elapsed since said selected data was stored in said first consolidated database.

4. The method of claim 1, wherein said request for selected data is received from a first data client.

5. The method of claim 1, further comprising:
delivering said selected data identified by said first request for selected data to said first data client.

6. The method of claim 1, further comprising:
receiving a second request for selected data from said first data client, wherein said selected data identified by said first request for selected data includes a portion of said updated selected data stored in said first consolidated database; and
delivering said selected data to one of a first data client and a second data client.

7. The method of claim 1, wherein said portion of said second data is less than all of said second data.

8. The method of claim 1, wherein said determining a need to update said selected data stored in said first consolidated database comprises detecting updated selected data stored in at least one of said first source database and said second source database.

9. The method of claim 1, further comprising:
receiving a second request for selected data from a fifth device comprising a second data client;
retrieving second data associated with said second request for data from one of said first source database and a second source database; and
storing said second data in said second consolidated database.

10. The method of claim 9, further comprising:
delivering said selected data identified by said second request for selected data to said second data client.

11. The method of claim 9, further comprising:
detecting a modification to data associated with said second request; and
storing said modified data in said second consolidated database.

12. The method of claim 1, wherein said data stored in said first source database includes data from a first data source and data from a second data source.

13. The method of claim 1, wherein said computational component comprises a computer readable storage medium.

14. The method of claim 1, wherein said computational component comprises a logic circuit.

15. A method for storing and distributing data, comprising:
receiving first data at a first source database, wherein said first source database is established on at least a first device;
storing said first data in said first source database;
receiving second data at a second source database, wherein said second source database is established on at least one of said first device and a second device;
storing said second data in said second source database;
receiving a first request for data, wherein said first request for data comprises a request for a first partial portion of data included in at least one of said first data and said second data;
delivering said first requested data to a first consolidated database, wherein said first requested data is a sparse representation of data included in said at least one of said first data and said second data, and wherein said first consolidated database is established on at least a third device;
storing said first requested data in said first consolidated database, wherein said first consolidated database contains a sparse representation of data included in said at least one of said first data and said second data, wherein said sparse representation comprises the first partial portion of data included in at least one of said first data and said second data, and wherein a second partial portion of data included in at least one of said first data and said second data is not stored in said first consolidated database;
monitoring by a sparse data replication component said first and second source databases, wherein said sparse data replication component is interposed between said first and second source databases and said first consolidated database;
as a result of said monitoring by said sparse data replication component, said sparse data replication component detecting a change in at least a portion of at least one of said first data and said second data, said at least a portion comprising data included in said first requested data;
in response to said sparse data replication component detecting a change in at least a portion of one of said first data and said second data, copying and delivering said changed portion of at least one of said first data and said second data from at least one of said first and second source databases to said first consolidated database; and
storing said changed portion of at least one of said first data and said second data in said first consolidated database, wherein after storing said changed portion of at least one of said first data and second data in said first consolidated database said first consolidated database continues to contain a sparse representation of data included in said changed at least one of said first data and said second data, wherein said sparse representation comprises the first partial portion of data included in at least one of said first data and said second data and said changed portion of at least one of said first data and said second data, and wherein a second partial portion of data included in at least one of said first data and said second data is not stored in said first consolidated database.

16. The method of claim 15, further comprising:
detecting at least one of redundant data and obsolete data in said first requested data stored in said first consolidated database; and
removing said at least one of redundant data and obsolete data from said consolidated database.

17. The method of claim 15, further comprising:
providing said data included in said first request for data to a first data client, wherein said first data client is established on at least a fourth device.

18. The method of claim 17, wherein said first request for data is received from said first data client.

19. The method of claim 17, further comprising:
providing said changed at least one of said first data and said second data to said data client.

20. The method of claim 15, wherein said first data and said second data are received from a first source.

21. The method of claim 15, wherein said first data is received from a first data source, and wherein said second data is received from a second data source.

22. The method of claim 15, further comprising:
receiving a second request for data, wherein said second request for data comprises a request for data included in at least one of said first data and said second data;
storing said second requested data in a second consolidated database, wherein said second consolidated database is established on a device that is different than said first, second or third devices;
monitoring said first and second databases;
detecting a change in at least a portion of at least one of said first data and said second data, said at least a portion comprising data included in said first requested data; and storing said changed at least one of said first data and said second data in said second consolidated database.

23. The method of claim 22, wherein said first request for data is received from a first data client, and wherein said second request for data is received from a second data client.

24. A database system, comprising:
a plurality of receiving databases, including first and second receiving database;
a replication component in communication with said plurality of receiving databases, wherein said replication component tracks changes to data stored in said plurality of receiving databases;
a consolidated database in communication with said replication component, wherein selected data from said first and second database of said plurality of said plurality of receiving databases is stored in said consolidated database, wherein said replication component is interposed between said plurality of receiving databases and said consolidated database, wherein said selected data from said first and second databases is stored in said consolidated database in response to said replication component querying said first and second receiving databases for first and second portions of said selected data, wherein said selected data is a sparse representation of data included in said first and second receiving databases, wherein in response to detecting changes in said selected data stored in at least one of said receiving databases said replication component determines a need to update said selected data stored in said consolidated database and copies changed selected data from at least one of said first and second receiving databases to said consolidated database, and wherein said changed selected data comprises less than a complete copy of data stored in said at least one of said plurality of receiving databases; and
a plurality of data clients in communication with said consolidated database, wherein said selected data stored in said consolidated database is selected in response to requests for data from said plurality of data clients.

25. The system of claim 24, wherein said consolidated database includes a data rationalization component, wherein redundant or obsolete data is detected and removed.

26. The system of claim 24, further comprising:
a plurality of consolidated databases in communication with said replication component, wherein selected data from at least one of said plurality of receiving databases is stored in a first of said consolidated databases, and wherein selected data from at least a one of said plurality of receiving databases is stored in a second of said consolidated databases.

27. The system of claim 26, wherein a first data client included in said plurality of said data clients is in communication with a first of said consolidated databases, and wherein a second of said data clients is in communication with a second of said consolidated databases.

28. The system of claim 24, further comprising:
a plurality of data sources, wherein at least a first data source is in communication with said first receiving database, and wherein at least a second data source is in communication with said second receiving database, and wherein said data sources and said receiving databases are established on different devices.

29. The system of claim 28, wherein said at least a first data source is also in communication with said second receiving database.

30. The system of claim 28, wherein at least one of said data sources comprises a call center.

31. A system for storing data, comprising:
first means for storing data, wherein first data is stored in said first means for storing data;
second means for storing data, wherein second data is stored in said second means for storing data;
third means for storing data, wherein first selected data comprising a copy of a selected portion of said first data and a selected portion of said second data is stored in said third means for storing data, wherein said third means for storing data contains a sparse representation of said first data maintained on said first means for storing data and a sparse representation of said second data maintained on said second means for storing data, and wherein said third means for storing data is established on a device that does not comprise said first and second means for storing data;
means for detecting a modification to one of said first selected data stored in said first means for storing data or said second selected data stored in said second means for storing data; and
means for updating said copy of said first selected data stored in said third means for storing data, wherein said means for updating is interposed between said first and second means for storing data and said third means for storing data, wherein said means for updating obtains an updated copy of said one of said first selected data from said first means for storing data or said second selected data from said second means for storing data in response to a signal from said means for detecting a modification to said one of said first selected data stored in said first means for storing data or said second selected data stored in said second means for storing data, wherein said means for updating stores said updated copy of said one of said first selected data stored in said first means for storing data or said second selected data stored in said second means for storing data in said third means for storing data, and wherein said third means for storing does not contain a complete copy of said first data or said second data.

32. The system of claim 31, further comprising means for rationalizing data stored in said third means for storing data.

33. The system of claim 31, further comprising:
means for designating said first selected data.

34. The system of claim 31, further comprising:
means for generating said first data in communication with said first means for storing data; and
means for generating said second data in communication with said second means for storing data.

35. The system of claim 31, further comprising:
fourth means for storing data, wherein second selected data comprising a copy of a selected portion of said first data is stored in said fourth means for storing data;
means for detecting a modification to said second selected data; and
means for updating said copy of said second selected data stored in said fourth means for storing data.

36. The system of claim 33, further comprising:
means for designating said second selected data.

37. The method of claim 15, wherein said sparse replication component interposed between said first and second source databases and said first consolidated database comprises a first sparse replication component, the method further comprising:
retrieving by a second sparse replication component data from said first consolidated database;
storing said data from said first consolidated database in a second consolidated database, wherein said second sparse replication component is interposed between said first consolidated database and said second consolidated database.

* * * * *